Nov. 26, 1968  C. A. CONNELL  3,412,480
EDUCATION APPARATUS
Filed Sept. 13, 1966  5 Sheets-Sheet 1

Clyde A. Connell
INVENTOR.

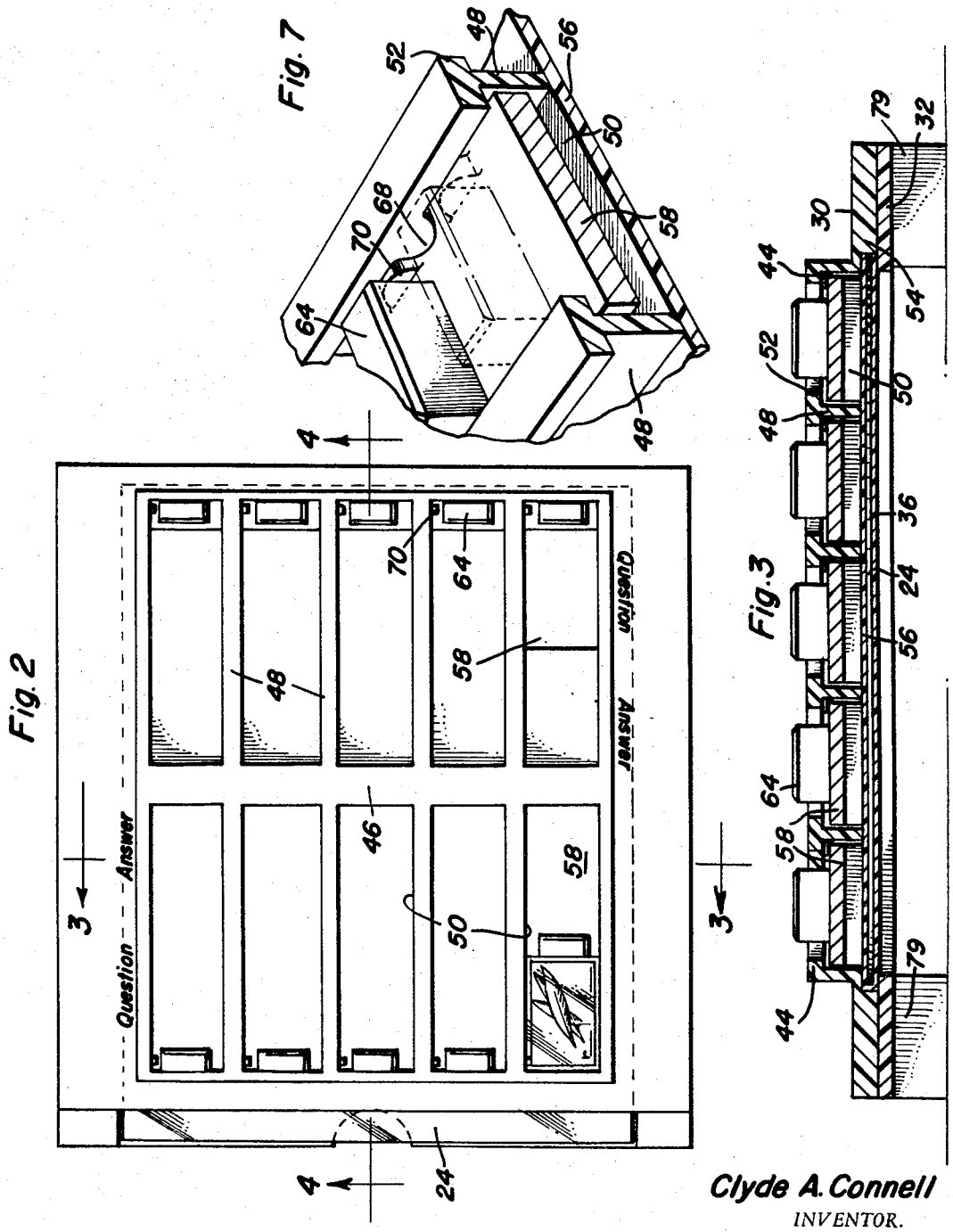

Nov. 26, 1968
C. A. CONNELL
3,412,480
EDUCATION APPARATUS
Filed Sept. 13, 1966
5 Sheets-Sheet 3
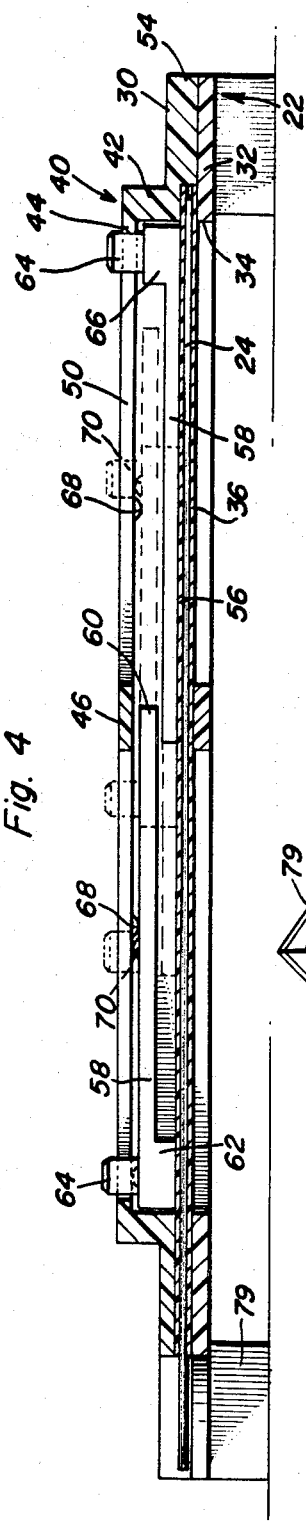
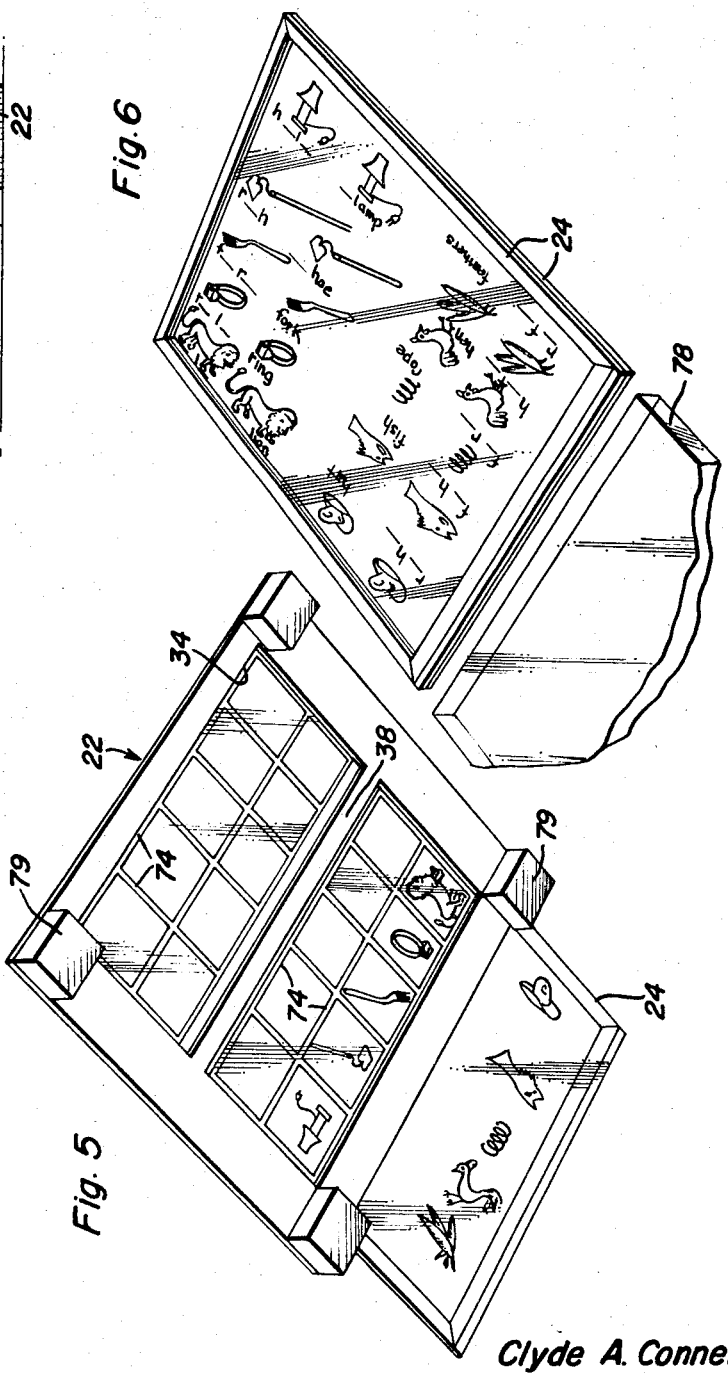
Clyde A. Connell
INVENTOR.

Nov. 26, 1968  C. A. CONNELL  3,412,480
EDUCATION APPARATUS
Filed Sept. 13, 1966  5 Sheets-Sheet 4
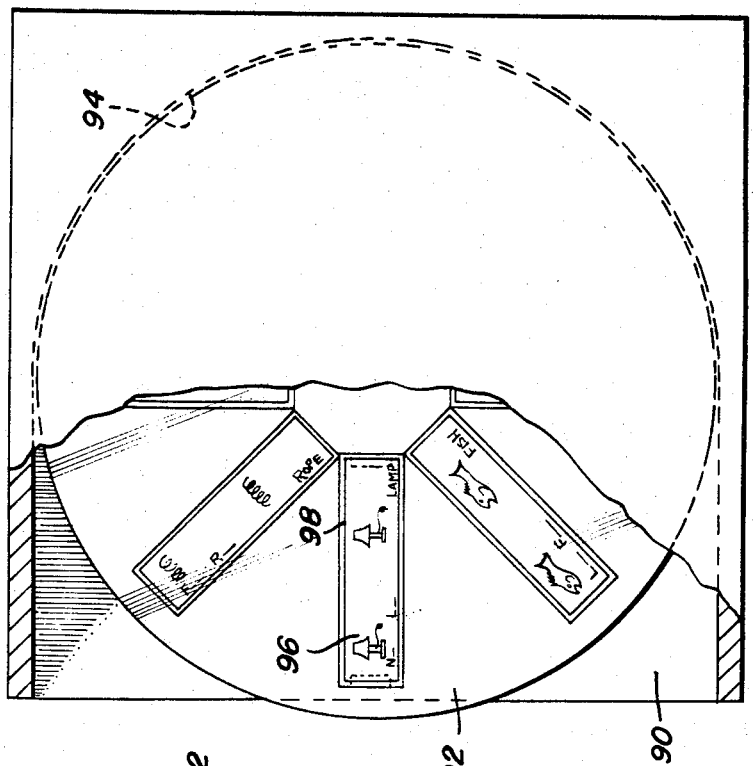
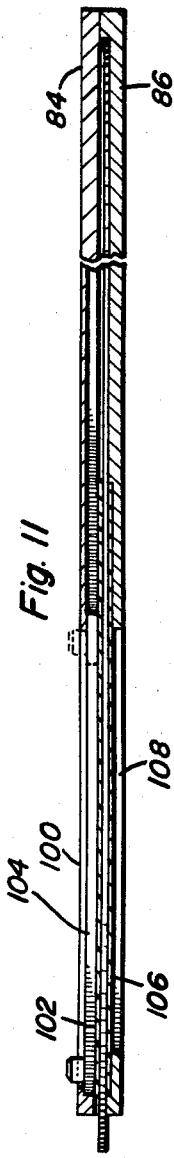
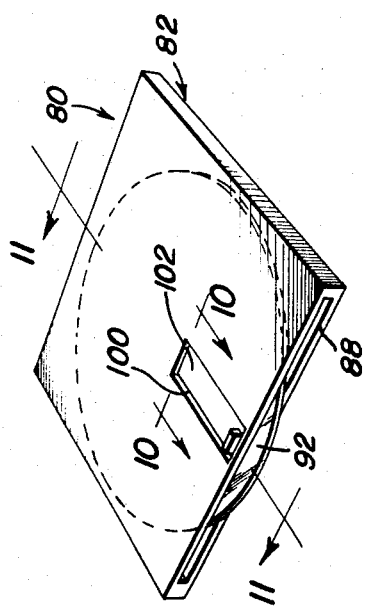
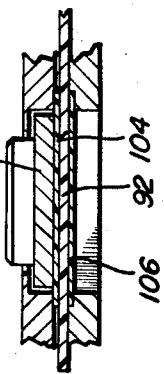
Clyde A. Connell
INVENTOR.

Nov. 26, 1968  C. A. CONNELL  3,412,480
EDUCATION APPARATUS
Filed Sept. 13, 1966  5 Sheets-Sheet 5
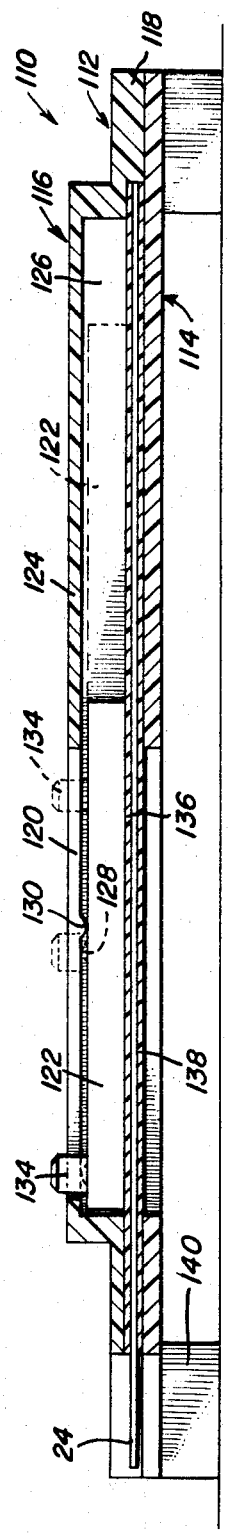
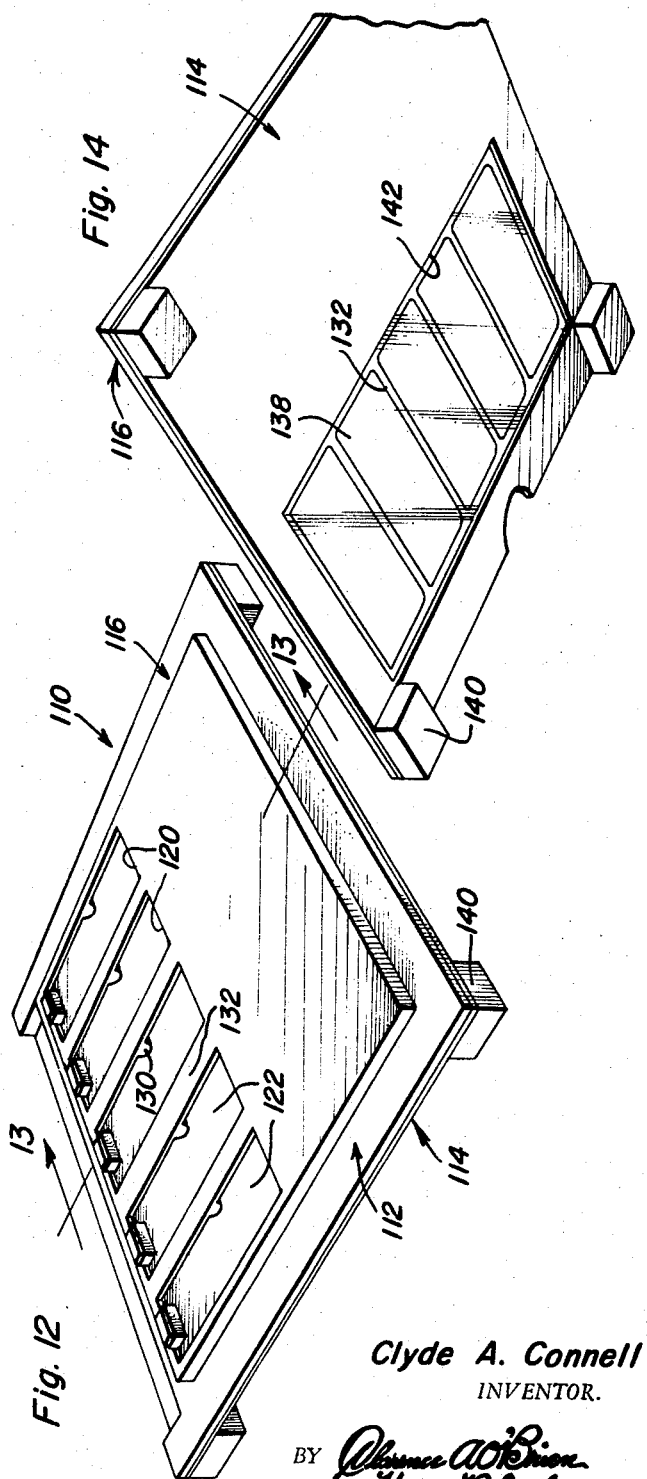
Clyde A. Connell
INVENTOR.

United States Patent Office

3,412,480
Patented Nov. 26, 1968

3,412,480
EDUCATION APPARATUS
Clyde A. Connell, Tyler, Tex., assignor to
James W. Fair, Tyler, Tex.
Filed Sept. 13, 1966, Ser. No. 579,040
11 Claims. (Cl. 35—9)

ABSTRACT OF THE DISCLOSURE

Information displaying apparatus for use in conjunction with projectors comprising a frame having top and bottom panels defining a pocket therebetween for the reception of an information bearing transparency. The bottom panel has an enlarged light passing window therein and the top panel is provided with selectively openable viewing ports so as to enable a selective projection of information through the frame by a projector. Closures are associated with the viewing ports in a manner whereby both a partial and a complete opening of the individual ports can be achieved with the information thereon being read from left to right.

---

The instant invention relates to new and useful improvements in education apparatus wherein problems are set forth for consideration and the answers thereto selectively disclosed in a manner which not only brings the student an immediate awareness of the correct answer, but also, through a visual indication thereof, reinforces the student's awareness of the correct answer.

It is a primary object of the instant invention to provide information displaying apparatus which is particularly adapted for use in conjunction with projectors, and more specifically overhead projectors wherein an enlarged stage is provided to receive a transparency for the projection of the information carried thereby onto a remote screen.

In conjunction with the above object, it is also a significant object of the instant invention to provide a frame which is adapted to selectively and interchangeably receive different transparencies and selectively disclose the information on the transparencies in a predetermined fashion.

Further, it is a significant object of the instant invention to provide transparencies which contain an arrangement of information systematically set forth as a series of problems and answers arranged in a manner so as to cooperate with the receiving frame for selective disclosure through a manipulation of closure means on the frame.

Another significant object of the instant invention resides in the provision of a frame which, through manipulatable portions thereof, enables the utilization of inexpensive transparencies for the disclosure of information thereon in a unique manner not heretofore contemplated in a system which approaches that of the instant invention in both ease of operation and reasonableness of costs.

Furthermore, it is an object of the instant invention to provide a transparency displaying frame which in itself includes means for effecting a prominent display of the material on the transparency received therein.

Also, it is an object of this invention to provide an education aid which is both inexpensive, thus making it readily available to all, and versatile in its uses.

Basically, the apparatus of the instant invention comprises a frame within which a pocket is defined between top and bottom walls or panels for the selective reception of removable sheets or transparencies. Each of the received sheets or transparencies includes a series of questions or problems thereon, along with the corresponding answers positioned adjacent thereto. The receiving frame in turn has a series of viewing ports or openings through the top wall thereof which are positioned so as to individually disclose a problem and its corresponding answer. Each of these top wall ports has a closure associated therewith which is capable of being selectively opened for initially disclosing the problem and subsequently disclosing the answer thereto in a systematic and predetermined manner. These ports and associated closures are orientated on the top wall of the frame so as to provide for a maximum utilization of the entire frame which is in turn of a size so as to correspond with the entire stage of a conventional overhead projector. The bottom wall of the frame includes an enlarged light passing window or opening defined centrally therein and of a size so as to encompass all of the ports in the top wall, this window either being open or having a transparent member thereover in order to enable the image projecting light to pass through a received transparency and any of the ports which might be opened. It is also contemplated that the top wall ports and associated closures be so orientated as to present a selective viewing from left to right with regard to all of the information to be exposed so as to provide an incidental training, especially of younger students, in the manner in which written information is normally viewed. Other features associated with the apparatus of the instant invention include preformed colored borders provided on the transparent portion of the bottom wall so as to provide an attractive and attention directing border about the projected information without going to the expense of making the individual transparencies themselves colored, and the utilization of a transparent sleeve or jacket for the retention of two or more overlying transparencies in a predetermined position for the production of an overlay effect. One particular modified form of frame contemplates the provision of a pocket including a semi-circular periphery for the reception of circular transparencies which are capable of being rotated therein for a selective disclosure of each question and associated answer through a single port having a progressively openable closure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of the apparatus;

FIGURE 3 is an enlarged cross-sectional view taken substantially on a plane passing along line 3—3 in FIGURE 2;

FIGURE 4 is an enlarged cross-sectional view taken substantially on a plane passing along line 4—4 in FIGURE 2;

FIGURE 5 is a bottom perspective view of the frame with a transparency partially withdrawn therefrom;

FIGURE 6 is a perspective view of a pair of transparencies and an associated transparent sleeve, the uppermost transparency illustrating the preferred arrangement of information thereon;

FIGURE 7 is a perspective detail illustrating one form of stop means which may be utilized in indicating the exposure of a predetermined portion of a top wall port;

FIGURE 8 is a perspective view of a modified form of apparatus;

FIGURE 9 is a top plan view of the apparatus of

Figure 1:
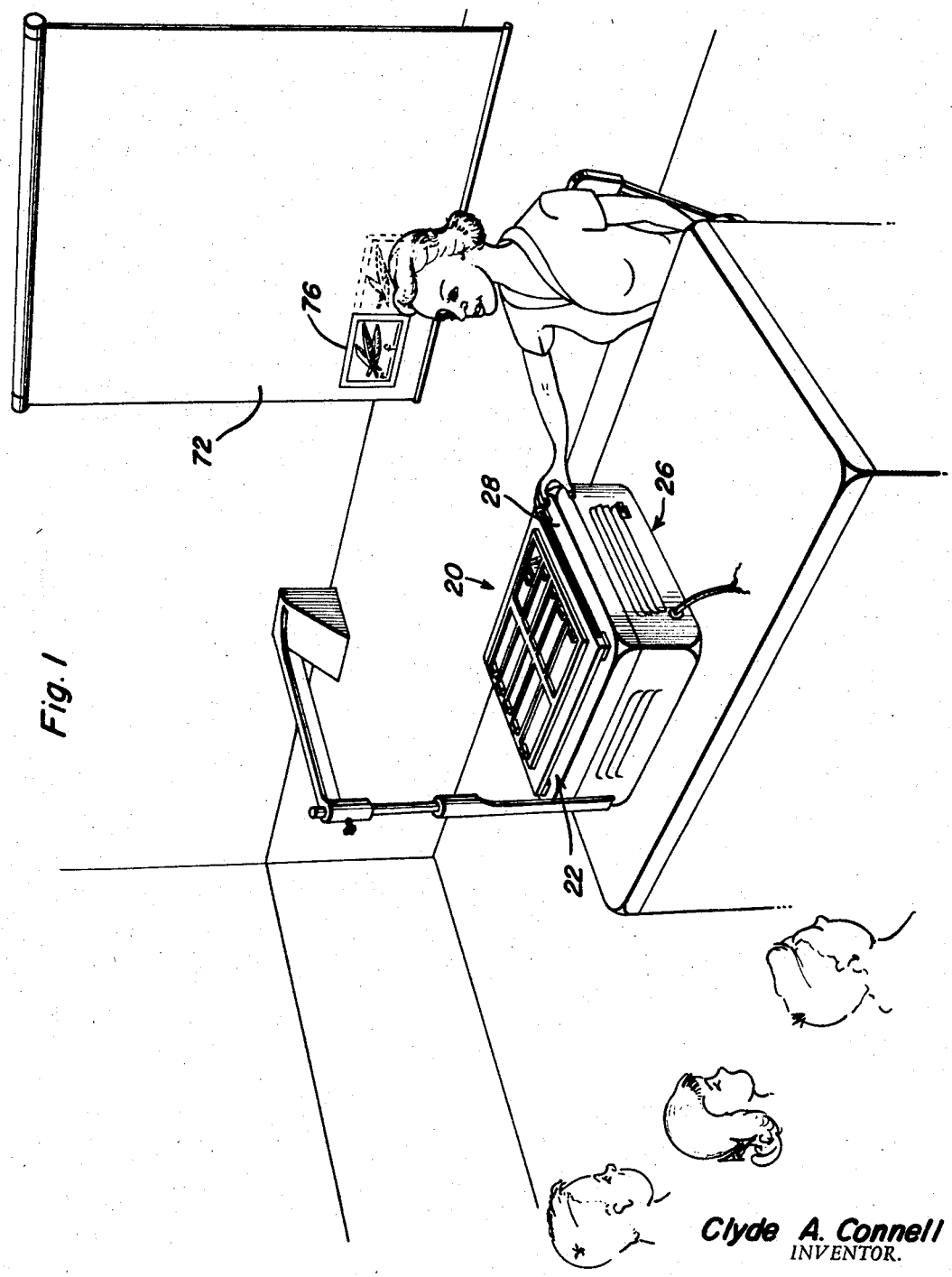
FIGURE 1 is a perspective view illustrating the education apparatus of the instant invention being utilized in conjunction with an overhead projector, this constituting the preferred manner of use contemplated.

FIGURE 8 with a portion thereof broken away for purposes of illustration;

FIGURE 10 is an enlarged partial cross-sectional view taken substantially on a plane passing along line 10—10 in FIGURE 8;

FIGURE 11 is an enlarged cross-sectional view taken substantially on a plane passing along line 11—11 in FIGURE 8;

FIGURE 12 is a perspective view of a second modified form of the education apparatus comprising the instant invention;

FIGURE 13 is an enlarged cross-sectional view taken substantially on line 13—13 in FIGURE 12 and detailing one particular type of closure adapted for use in conjunction therewith; and FIGURE 14 is a partial bottom perspective view of the apparatus.

Referring now more specifically to the drawings, reference numeral 20 is used to generally designate the education apparatus comprising the instant invention. This apparatus 20 consists basically of a frame 22 and a plurality of sheets or transparencies 24 selectively receivable within said frame for display thereby. The apparatus 20 will normally be used in conjunction with a conventional overhead projector as indicated in FIGURE 1, the receiving frame 22 being positioned upon the projector stage 28 and being of a size so as to cover the entire stage 28 and mask the light coming therethrough.

The frame 22 itself consists of a pair of superimposed top and bottom rectangular panels 30 and 32 peripherally sealed to each other about three sides thereof so as to define an internal rectangular pocket accessible through the fourth side for the introduction and removal of the transparencies 24. The bottom panel or wall 32 has an enlarged central window or opening 34 defined therethrough which enables the passage of the projector generated light through a received transparency 24 which overlies the bottom panel or wall 32 within the pocket. This opening 34 is generally, although not necessarily, provided with a transparent sheet 36 thereover, this sheet 36 being affixed to the upper face of the bottom panel 32 within the transparency receiving pocket. With reference to FIGURE 5, it will be noted that an integral rib or bar 38 may be provided transversely across the opening 34 so as to increase the rigidity of the bottom panel 32 and additionally support the transparent bottom sheet 36 and a received transparency 24.

The top panel or wall 30 includes a rectangular upwardly enlarged housing 40 substantially coextensive with the bottom panel opening 34. This housing 40 is defined by a peripheral upstanding wall 42 having a narrow inwardly projecting flange 44 thereon. An elongated centrally located flat transverse rib 46 is provided parallel to the bottom panel rib 38, and a plurality of upright ribs 48 extend across the housing 40 perpendicular to the center rib 46 at equally spaced points across the housing 40 so as to define, in conjunction with rib 46, two rows of viewing ports 50 as best seen in FIGURES 2 and 3. Each of the ribs 48 includes, along the full length thereof, a cap defining relatively narrow laterally directed flanges 52 coplanar with the wall flanges 44 and cooperative with both each other and with the wall flanges so as to provide closure retaining means. With reference to FIGURES 3 and 4, it will be noted that the rib 46, which parallels the open edge of the frame 22, is coplanar with the wall and rib flanges 44 and 52, while the ribs 48 are of a depth substantially equal to the height of the housing wall 42 so as to in effect define chambers transversely across the housing 40 perpendicular to the open edge of the frame 22, each chamber being divided into equal size viewing ports 50 by the rib 46. With continued reference to FIGURES 3 and 4, it will be noted that the peripheral edge portion of the upper panel 30 has a downwardly projecting thickened portion 54 which acts so as to upwardly offset the central portion of the top panel 30 which in turn carries the housing 40, thereby defining the internal pocket accessible through the left hand edge of the frame 22 as viewed in FIGURE 2. The undersurface of the top panel 30, beneath the housing 40 and inward of the entry edge thereof, is also provided with a transparent sheet 56 permanently affixed thereto and upwardly spaced from the lower panel sheet 36 so as to smoothly receive and protectively and visibly enclose a transparency 24.

Selectively opening and closing each of the ports 50 is a closure member which, in the illustrated embodiment of the invention, comprises an elongated sliding panel or door 58. With reference to FIGURES 2 and 4, it will be noted that the closure panels 58 in each laterally aligned pair of ports 50, which are defined by a single chamber and the central rib 46, include a lower closure panel which is supported directly upon the top panel transparent sheet 56 and an upper closure panel which has the inner end 60 slidably received on the lower closure panel and the outer end thereof provided with a depending portion 62 also slidably received on the transparent underlying top panel sheet 56. In this manner, the closure panels 58 are capable of bypassing each other upon being laterally slid, the lateral movement of the closure panels 58 being facilitated by upwardly projecting handles 64.

The downwardly enlarged portion 62 of each of the upper closure panels 58, these panels being those associated with the left hand ports 50 in the frame 22 as orientated in FIGURES 2 and 4, constitutes a stop to the lateral bypassing movement of the associated lower closure panel 58 illustrated to the right hand side of FIGURES 2 and 4. The lower closure panels 58 are, in turn, provided with outer upwardly projecting end portions 66 which act as a limit to the bypassing movement of the associated upper closure panels 58, the handle 64 on each of the lower closure panels 58 being mounted directly upon the upwardly enlarged outer end portion 66 as will be appreciated from the drawings.

With particular reference to FIGURES 3 and 7, it will be noted that the bypassing closure panels 58 are retained within their corresponding chambers by means of the overhanging narrow rib and wall flanges 52 and 44. Each of the closure panels 58 is of course of a length so as to selectively completely close or substantially completely open the corresponding port 50.

In actual use, each closure panel 58 will be initially slid open half-way so as to expose a question or problem, and subsequently opened fully so as to disclose, through the same port, the adjacent answer. In order to enable the user of the device, or instructor, to properly expose the problem without exposing the answer, it is contemplated that a simple stop means be provided which will automatically position the corresponding closure panel 58 in its problem exposing half-open position. One such means can, viewing FIGURES 4 and 7, consist of opposed rounded projections 68 and 70, the projection 68 depending from the corresponding narrow flange 44 or 52 at approximately the center of an associated port 50 along the length thereof, and the projection 70 extending upwardly from the corresponding closure panel 58 adjacent the handle bearing outer end thereof. In this manner, as the closure panel 58 is slid open, the projection 70 thereon will engage against the projection 68 and provide an automatic indication of the proper exposure of the problem. When it becomes desirable to expose the associated answer, a slight increase in pressure on the closure panel moving handle 64 will result in a forcing of the projection 70 by the projection 68 for a continued movement of the closure panel 58. It will of course be appreciated that the associated rounded projections 68 and 70 are so related to each other as to give an automatic indication of the engagement therebetween, while at the same time allowing for a relatively easy movement of the closure panel mounted projection 70 past the flange mounted projection 68.

With reference to FIGURES 1, 2 and 4, it will be noted that the closure panels or doors 58 associated with the left hand row of viewing ports 50 open from left to right while the closure panels or doors 58 associated with the right hand row of viewing ports 50 open from right to left, thereby allowing for the afore described bypass movement of the doors. However, inasmuch as it is contemplated that all of the information be presented from left to right, thereby encouraging the viewer, in most instances a student, to observe printed matter in the proper sequence, the frame 22, in normal use, will be rotated into a reverse position subsequent to a viewing of the information in the left hand row of ports. In other words, viewing the frame as illustrated in FIGURE 2, the right hand row of ports is, upon a reversing of the frame 22, inverted and positioned to the left of the other row of ports in order that the port closure panels 58 might also be opened from left to right in a manner so as to initially expose the question or problem and subsequently expose the answer. The manner in which the frame 22 is to be inverted will be appreciated from the indicated headings "Question" and "Answer" on the frame of FIGURE 2. To enable this turning of the frame so as to always provide for a disclosure of the information from left to right, it will also be appreciated that the information on each of the associated transparencies 24 must include an inverted row of information for presentation, upon a proper orientation thereof, from left to right. This is clearly illustrated in FIGURE 6 in conjunction with the top of the two stacked transparencies 24 wherein the left hand column of problems and answers is properly orientated for sequential disclosure from left to right while the right hand row of problems and answers must be inverted, in conjuncton with the frame 22 itself, for a proper disclosure. Viewing FIGURE 1, it will be recognized that the conventional overhead projector 26 will present the information on the viewing screen 72 in the same relationship as the information appears on the stage 28.

It has been found that the introduction of color into a projected picture tends to hold the viewer's interest and more properly direct his attention to the material being projected. However, to provide for such color on a large number of transparencies, which the instant invention contemplates using interchangeably, could result in a substantial expense as compared to conventional uncolored transparencies. Accordingly, in order to introduce the desired color without encountering the expense of providing the color on the individual transparencies, it is contemplated that the transparent sheet 36, secured in overlaying relation to the bottom panel 32, be provided with colored strips 74 integrally formed therein or thereon and orientated so as to define colored borders 76, noting FIGURES 1 and 5, about both the projected problem and about the subsequently projected associated answer. In this manner, the desired attention directing color will automatically be introduced into any projected image originating from a conventional non-colored transparency. This use of color can be utilized for a variety of different purposes, including superimposed color boxes of different size and color so as to provide different size information boxes as may be required when disclosing information from different transparencies. In addition, by the utilization of different colors on the right and left sides of the transparent sheet 36, an automatic indication of the proper disclosure sequence will be presented should such be necessary.

With reference to FIGURE 6, attention is directed to the fact that the instant invention also contemplates the necessity of using two or more transparencies 24 in overlying relationship to each other for the presentation of certain effects, as might be desired in presenting particular information. In order to insure a proper relationship of the transparencies relative to each other, a transparent sleeve 78 is utilized, this sleeve 78 receiving the stacked transparencies and enabling a simplified proper orientation of the transparencies relative to each other prior to insertion of the sleeve and contained transparencies within the frame pocket. It will of course be appreciated that the frame pocket would have to be of a size so as to receive the stacked transparencies 24 and enclosing sleeve 78. However, inasmuch as only two or three transparencies will be overlaid at one time, the relatively thin configuration of the frame 22, as illustrated in the drawings, can be maintained.

In use, the frame 22 is positioned upon the stage 28 of a suitable overhead projector 26 and the appropriate transparencies 24 sequentially introduced thereinto for a selective disclosure of the information contained thereon. If deemed necessary, it is contemplated that legs 79, approximately one inch tall, be provided at the corners of the frame 22 for maintaining the frame 22 in slightly spaced relation above the stage 28 to allow for an escape of the generated heat and so as to protect the lens. Further, while not specifically illustrated, it is also contemplated that some means, such as thin foam pads, be provided either directly on the bottom panel 32 of the frame 22 or on the legs 79 so as to resist any tendency for the frame to slide on the projector stage 28, especially during the manipulation of the closure panels or doors 58. The frame 22 will of course be of a size so as to completely cover the stage 28 and intercept all of the light projecting therethrough whereby the only lighted area appearing on the screen 72 will be that projecting through the opened ports 50. With regard to the size of the frame 22, when legs 79 are provided thereon, the frame 22 will actually extend beyond the stage so as to protect the operator's eyes from the projector light. Concerning the doors or panels 58, it should be appreciated that while a pair of bypass panels 58 have been illustrated in conjuncton with each laterally aligned pair of ports 50, various other types can be utilized. For example, the panels 58 might be flexible in nature and actually roll into a centrally located receiving chamber, or, in a more elaborate device, electrical means may be provided for automatically actuating the closure panels 58.

Because of its use as a means for retaining transparencies for projection by means of an overhead projector 26, it will be appreciated that the bottom panel 32 will be provided with an enlarged central opening 34. This opening 34, as noted previously, is to preferably be provided with an overlying transparent sheet 36 which cooperates with the transparent sheet 56 for receiving and protectively enclosing the selected transparency 24, while at the same time allowing for a free projection of the projector originated light therethrough with the image on the transparency 24 being picked up and projected to the screen 72 for viewing. Although not specifically illustrated, it should be noted at this point that, as a modification of the illustrated frame 22, the top panel 30 may be hinged to the bottom panel 32 for opening movement relative thereto so as to allow for a cleaning of the interior of the pocket.

Attention is now particularly directed to FIGURES 8–11 wherein a modified form of education apparatus has been illustrated. This modified apparatus, generally referred to by reference numeral 80, includes a rectangular frame 82 comprising top and bottom panels 84 and 86 peripherally secured to each other about three edges with the fourth edge 88 thereof remaining open so as to allow access to an interiorly defined pocket 90 for the reception of interchangeable circular transparencies 92 to be used in conjunction with the frame 82. The inner end of the pocket 90, viewing FIGURE 9, is provided with a semi-circular seat 94 which receives and properly positions the transparency 92. The information, which may consist of a problem 96 and an answer 98, is provided radially on each of the associated transparencies 92 for selective viewing through a single viewing port 100 extending longitudinally inward from a point adjacent the open edge 88 of the frame 82 along the center line thereof. The single port 100 is provided with a selectively openable closure panel or door 102 mounted and manipulated in any conventional manner, such as that described in conjunction with the closure panels 58, for selective exposure of the information from left to right. With reference particularly to FIGURES 10 and 11, it will be noted that the viewing port 100 is provided with an underlying sheet of transparent material 104 upon which the door 102 may be supported, while a similar transparent sheet 106 is secured to the bottom panel 86 in overlying relation to an opening 108 of approximately the same size as, and in underlying relation to, the port 100. Thus, the frame 82 can be positioned upon a projector stage 28 in the same manner as the frame 22 with the projector light projecting through that portion of the associated transparency 92 aligned with the port 100 and the underlying bottom panel opening 108, both in turn provided with transparent overlays 104 and 106 secured thereto so as to form a protective means for the transparency 92. Referring again to FIGURE 9, it will be appreciated that the information on the transparency 92 received within the frame pocket 90 is selectively aligned with the port 100 through a manual rotation of the transparency 92, the seat defining inner end 94 of the pocket 90 insuring a proper orientation of the transparency 92 and providing a base against which the transparency 92 can guide as it is being rotated.

A final modified form of education apparatus to be specifically illustrated and described appears in FIGURES 12–14. In this form of the invention, reference numeral 110 is used to designate the frame itself. The frame 110, as was the case with the frame 22, consists basically of a pair of superimposed top and bottom rectangular panels 112 and 114 with the top panel 112 having a rectangular upwardly enlarged housing 116 defined centrally therein and encompassing a major portion of the top panel 112 aside from a narrow border which is, on the three secured sides, downwardly enlarged as at 118 so as to upwardly offset the central portion of the top panel 112 and define the transparency receiving internal pocket.

The top panel 112 differs from the top panel 30 in that the viewing ports 120 are provided in a single row along the left hand side of the housing 116, rather than in two rows as with the viewing ports 50. The closure panels or doors 122 associated with the ports 120 are of course to open from left to right for an exposure of the information in a sequence corresponding to that normally associated with reading the English language. Each of the closure panels or doors 122, viewing FIGURE 13, will slide from a first position closing the associated viewing port 120 in the top wall 124 of the housing 116 to a second position received within a pocket 126 defined within the housing 116 laterally of the corresponding port 120. Further, opposed rounded projections 128 and 130 may be provided on each door 122 and the door retaining overhanging flange of an adjacent panel defining rib 132, corresponding to the ribs 48, so as to provide a simple stop means for automatically positioning the corresponding door 122 in a problem exposing half-open position. The projections 128 and 130 will of course easily ride past each other upon the introduction of a slight addition push to the door 122 through the associated handle 134.

A transporent sheet 136 is affixed to the undersurface of the top panel 112 and forms a clear base upon which the doors 122 will slide. A similar transparent sheet 138 is affixed over the upper surface of the bottom panel 114 with both transparent sheets, 136 and 138 defining protective films within the transparency receiving pocket for the protective reception of the individual transparencies 24, these transparent sheets 136 and 138 of course not interfering with the projector generated light.

The frame 110, also supported on legs or raised portions 140, is to utilize the aforedescribed transparencies 24. However, rather than requiring a reversal of the entire frame 110, such as will require a careful reorientation of the frame on the projector stage, in utilizing the frame 110, only the transparency 24 itself need be reversed so as to continue to project the information from left to right. Incidentally, it will of course be appreciated that the opening 142 provided in the bottom panel 114 so as to allow for the projection of the light through the ports 120 is provided in underlying relation to the ports 120 themselves, and as such, is only defined in approximately the left hand portion of the bottom panel 114.

The frame 110 can also, if so desired, have the bottom transparent sheet 138 provided with the aforementioned colored strips for the projection of colored borders about the projected images. In addition, the frame 110 is also contemplated to be able to accommodate stacked transparencies for the illustration of an overlay effect if such is deemed desirable. It should be appreciated that, inasmuch as only one row of viewing ports 120 is provided through the top of panel 112, these portions 120 can, if deemed desirable or necessary, be of a substantially greater size than the ports 50 associated with the frame 22.

With regard to all three forms of display frame, 22, 82 and 110, it will be appreciated that they enable the utilization of inexpensive transparencies while at the same time providing for a display of the information on the transparencies in a novel and highly desirable manner heretofore unavailable. The frames themselves are of a relatively simple durable construction which, in conjunction with the inexpensive nature of the transparencies, should enable any school system or group to avail themselves thereof. The information sheets or transparencies are to of course be constructed so as to present information relative to any subject wherein a visual presentation would be of value. Further, each transparency in itself is so designed as to present several problems and associated answers for sequential disclosure through a manipulation of the frame closure members, thus avoiding the necessity of utilizing a single transparency for each bit of information which is to be individually disclosed, as required with the conventional transparencies positioned directly upon a projector stage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Education apparatus comprising a frame, a pocket defined in said frame for the removable reception of at least one information sheet, and movable means on said frame for selectively exposing portions of a received information sheet in a predetermined order, said frame including opposed flat panels constituting a top panel and a bottom panel, said pocket being defined between said panels and opening through one edge of said frame, said top panel including a plurality of viewing ports defined therein for exposure of spaced sections of a received information sheet therebelow, said movable means comprising a closure associated with each port and selectively movable from a first position closing said port and precluding exposure of a received information sheet to a second position opening said port and exposing an aligned section of a received information sheet, said bottom panel having an enlarged central opening defined therein in underlying relation to said ports so as to define a view passage through said bottom panel and any open port positioned thereabove, each closure being slidably mounted for sliding movement between the open and closed positions, stop means associated with each port along the path of movement of the corresponding closure between the opened and closed positions, said stop means constituting a temporary physical limit to movement of said closure, said stop means being by-passable upon a continued movement of the closure.

2. The apparatus of claim 1 wherein said viewing ports are arranged in a single column through a portion of the top panel, the closures for said ports selectively exposing said ports from left to right.

3. The apparatus of claim 1 wherein said viewing ports are arranged in left and right columns, the closures for the left column opening from left to right, the closures for the right column opening from right to left.

4. Education apparatus comprising a frame, said frame including a top panel, a pocket defined in said frame below said top panel for the removable reception of at least one information sheet, said top panel including at least one viewing port defined therethrough and exposing a section of a received information sheet therebelow, a closure associated with said port and selectively movable from a first position closing said port and precluding exposure of a received information sheet to a second position opening said port and exposing an aligned section of a received information sheet, said closure being slidably mounted for sliding movement between the open and closed positions, stop means associated with said port along the path of movement of the closure between the opened and closed positions, said stop means constituting a temporary physical limit to movement of said closure, said stop means being by-passable upon a continued movement of the closure.

5. The apparatus of claim 4 in combination with an information sheet receivable within said pocket, said information sheet having informative indicia provided thereon in two parallel columns, a left column and a right column, the indicia in the left column being displayable through said single column of ports upon an insertion of the information sheet into said pocket with the left indicia column underlying the port column, the indicia in the right column being inverted and selectively displayed upon a rotation of the information sheet, and an insertion of the rotated sheet into said pocket with the right indicia column underlying the single port column.

6. The apparatus of claim 5 wherein said port column is provided on the left-hand portion of the top panel.

7. The apparatus of claim 4 wherein said top panel has a plurality of viewing ports defined therein for exposure of spaced sections of a received information sheet, a closure associated with each port for the independent opening and closing of each port, and stop means associated with each port for constituting a temporary physical limit to movement of said closure.

8. The apparatus of claim 4 including a bottom panel secured to and paralleling said top panel in spaced relation thereto, said bottom panel having an enlarged light passing opening defined therein in alignment with the viewing port.

9. Education apparatus adapted for use in conjunction with a projector, said apparatus comprising a transparency receiving frame in combination with at least one transparency receivable therein for display thereby, said frame comprising a top and a bottom defining a transparency receiving pocket therebetween, said pocket opening through one side of said frame, a plurality of informative indicia provided on said transparency, said top having a plurality of openings defined therein in alignment with said plurality of indicia for the exposure thereof, a closure associated with each opening for a selective opening and closing of the opening independent of the other openings, said bottom having an opening defined therein in underlying alignment with the top openings, a transparent sheet fixed to the bottom and overlying the opening therein for the exposure of the plurality of indicia to a projector source of light for a projection of those indicia in alignment with an opened top opening.

10. The apparatus of claim 9 wherein said top openings and indicia are arranged in two parallel rows, a left row and a right row, the closures associated with the openings in the left row opening from left to right, the closures associated with the openings in the right row opening from right to left, the indicia in the right row being inverted and requiring a rotation of the frame to effect a proper display of the right row indicia.

11. The apparatus of claim 9 wherein said transparent sheet has a plurality of borders defined in projectable color thereon in alignment with said top panel openings for projection through the opened ones of said openings in conjunction with the corresponding transparency indicia.

References Cited
UNITED STATES PATENTS

| | | | |
|---|---|---|---|
| 2,193,745 | 3/1940 | Sterne | 35—8 |
| 2,701,981 | 2/1955 | Rutt | 88—24 |
| 3,103,750 | 9/1963 | Werner | 35—9 |
| 3,224,112 | 12/1965 | Hanson | 35—9 |
| 3,230,642 | 1/1966 | Goldschmidt | 35—9 |
| 3,339,288 | 9/1967 | Sacks | 35—9 |

EUGENE R. CAPOZIO, *Primary Examiner.*

WALTER W. NIELSEN, *Assistant Examiner.*